United States Patent
Deng et al.

(10) Patent No.: US 6,238,460 B1
(45) Date of Patent: May 29, 2001

(54) AIR PURIFICATION PROCESS

(75) Inventors: Shuguang Deng, Somerville, NJ (US); Ravi Kumar, Allentown, PA (US); Martin Bülow, Basking Ridge, NJ (US); Frank R. Fitch, Bedminster, NJ (US); Adeola Florence Ojo, Scotch Plains, NJ (US); Craig S. Gittleman, Fanwood, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/277,306

(22) Filed: Mar. 26, 1999

Related U.S. Application Data

(63) Continuation-in-part of application No. 08/938,418, filed on Sep. 26, 1997, now abandoned.

(51) Int. Cl.$^7$ .................................................. B01D 53/049
(52) U.S. Cl. ............................ 95/98; 95/102; 95/119; 95/122; 95/139
(58) Field of Search .................... 95/96–98, 100–105, 95/117–119, 121, 122, 139

(56) References Cited

U.S. PATENT DOCUMENTS

| | | | |
|---|---|---|---|
| 3,738,084 | 6/1973 | Simonet et al. | 95/139 X |
| 3,981,698 | 9/1976 | Leppard | 95/139 X |
| 4,249,915 | 2/1981 | Sircar et al. | 95/139 X |
| 4,477,264 | 10/1984 | Kratz et al. | 95/139 X |
| 4,627,856 | 12/1986 | von Gemmingen | 95/139 X |
| 4,711,645 | 12/1987 | Kumar | 95/98 |
| 4,775,396 | 10/1988 | Rastelli et al. | 95/139 X |
| 4,986,835 | 1/1991 | Uno et al. | 95/139 X |
| 5,110,569 | 5/1992 | Jain | 423/230 |
| 5,156,657 | 10/1992 | Jain et al. | 95/139 X |
| 5,169,413 | 12/1992 | Leavitt | 95/139 X |
| 5,202,096 | 4/1993 | Jain | 95/139 X |
| 5,232,474 | 8/1993 | Jain | 95/98 X |
| 5,395,427 | 3/1995 | Kumar et al. | 95/122 X |
| 5,425,242 | 6/1995 | Dunne et al. | 95/119 X |
| 5,447,558 | 9/1995 | Acharya | 95/139 X |
| 5,451,248 | 9/1995 | Sadkowski et al. | 95/139 X |
| 5,536,301 | 7/1996 | Lansbarkis et al. | 95/117 |
| 5,560,763 | 10/1996 | Kumar | 95/139 X |
| 5,587,003 | 12/1996 | Bülow et al. | 95/139 X |
| 5,614,000 | 3/1997 | Kalbassi et al. | 95/96 |
| 5,624,477 | 4/1997 | Armond | 95/139 X |
| 5,674,311 | 10/1997 | Notaro et al. | 95/139 X |
| 5,728,198 | 3/1998 | Acharya et al. | 95/139 X |
| 5,755,857 | 5/1998 | Acharya et al. | 96/133 X |
| 5,769,928 | 6/1998 | Leavitt | 95/139 X |
| 5,779,767 | 7/1998 | Golden et al. | 95/139 X |
| 5,855,650 | 1/1999 | Kalbassi et al. | 95/139 X |

FOREIGN PATENT DOCUMENTS

| | | | |
|---|---|---|---|
| 0 586 830 | 3/1994 | (EP) | 95/117 |
| 0 750 852 | 1/1997 | (EP) . | |
| 360007919 | 1/1985 | (JP) | 95/139 |
| 402275707 | 11/1990 | (JP) | 95/139 |
| 1 068 150 | 1/1984 | (SU) | 95/139 |

*Primary Examiner*—Robert H. Spitzer
(74) *Attorney, Agent, or Firm*—Philip H. Von Neida; Salvatore P. Pace

(57) ABSTRACT

Substantially all of the carbon dioxide is removed from a gas containing up to about 1% by volume carbon dioxide by subjecting the gas to a pressure swing adsorption process using a two layer adsorption system, wherein the first layer contains activated alumina and the second layer is a zeolite or a combination of zeolites having a silicon to aluminum atomic ratio of at least 1.5. The process is particularly suitable for removing substantially all carbon dioxide and water vapor contained in air prior to subjecting the air to cryogenic distillation.

10 Claims, No Drawings

AIR PURIFICATION PROCESS

This is a continuation-in-part of U.S. patent application Ser. No. 08/938,418, filed Sep. 26, 1997 now abandoned.

FIELD OF THE INVENTION

This invention relates to the purification of air, and more particularly to the removal of water vapor and carbon dioxide from air in preparation for its separation by cryogenic distillation. In particular, the invention concerns the production of high purity air by subjecting the air to a pressure swing adsorption (PSA) process using a two layer adsorption system wherein the first layer comprises activated alumina and the second layer comprises one or more of certain carbon dioxide-selective zeolite adsorbents.

BACKGROUND OF THE INVENTION

In many industrial processes using a gaseous feed stream it is desirable or necessary to remove carbon dioxide from the gaseous feed stream prior to certain steps of the process. For example, in the separation of atmospheric air into its component parts by cryogenic distillation, it is necessary to prepurify the air by removing carbon dioxide and water vapor from the air feed prior to refrigerating the air; otherwise, these gases would condense and freeze in the refrigeration heat exchange equipment and eventually clog the equipment, thereby necessitating removal of the equipment from service for removal of the frozen carbon dioxide and ice.

The carbon dioxide and water vapor can be removed from gas streams by a number of techniques. One well known method involves the use of pairs of reversing heat exchangers that are operated alternately, such that one heat exchanger is in purification service while the other is undergoing frozen carbon dioxide and ice removal. Specifically, in this method the gas feed is passed through one heat exchanger in exchange with a refrigerant, which causes the carbon dioxide and water vapor to freeze onto the surfaces of the heat exchanger. When the buildup of frozen carbon dioxide and ice in the heat exchanger reaches a certain level, the heat exchanger is taken out of service to remove, by sublimation and melting, the frozen carbon dioxide and ice. The other heat exchanger of the pair, from which frozen carbon dioxide and ice have been removed, is then placed into purification service. This method has the disadvantage that a considerable amount of heat energy is required to sublime and melt the frozen carbon dioxide and ice during regeneration of the heat exchangers.

A popular method of removing carbon dioxide and water vapor from gas streams is adsorption. One common adsorption method of air prepurification is PSA using two serially-connected adsorption layers, the first layer containing a desiccant, such as silica gel or activated alumina for water vapor removal, and the second layer containing a carbon dioxide-selective adsorbent, such as sodium-exchanged type X zeolite (13X zeolite). A two layer air prepurification system comprising a first bed of adsorbent selective for the removal of water from an air stream, for example alumina or silica gel, and a second bed of adsorbent selective for the removal of carbon dioxide, for example, 5A, 13X, calcium X or sodium mordenite, is disclosed in U.S. Pat. No. 4,711,645. Other two layer air prepurification PSA processes are described in U.S. Pat. Nos. 5,110,569 and 5,156,657, the disclosures of which are incorporated herein by reference. This method has a number of disadvantages. Firstly, it is difficult to desorb carbon dioxide from the 13X zeolite. Also, the layer of zeolite develops "cold spots" in its upstream region, i.e. in the vicinity of the inlet of the zeolite adsorbent, and the process becomes unstable with time.

Temperature swing adsorption (TSA) processes have also been practiced for the removal of carbon dioxide from nonpolar gas streams using the above discussed combination of adsorbent layers. U.S. Pat. No. 5,110,569, mentioned above, shows such a process. TSA processes have also been practiced using a single layer of adsorbent. A major disadvantage of the described TSA process is that a great quantity of heat energy is required in the adsorbent regeneration step, since both layers must be heated sufficiently to drive off the adsorbed moisture and carbon dioxide.

Air prepurification by PSA has also been practiced using a single bed of adsorbent which removes both water vapor and carbon dioxide. Such a process is disclosed in U.S. Pat. No. 5,232,474, which uses a single layer of activated alumina as adsorbent. The principal disadvantages of this method of air prepurification are that it is difficult to produce high purity air by this method, a high volume of purge gas is required to effect adequate adsorbent regeneration and the process becomes unstable over time.

Certain metal-exchanged type Y zeolites have been used to remove ethylene from air streams. For example, EP 0 750 852, published Jan. 2, 1997, discloses the removal of water vapor, ethylene, nitrogen and carbon dioxide from air streams by adsorption using a series of adsorption beds, including a first bed containing alumina to remove moisture from the air, a second bed containing silver-exchanged type Y zeolite to remove ethylene from the air and a third bed containing 13X zeolite to remove nitrogen and carbon dioxide from the air.

Superior methods of producing high purity air are continuously sought. The present invention provides a method which accomplishes this, and does so with low energy and capital expenditures.

SUMMARY OF THE INVENTION

According to a broad embodiment of the invention, carbon dioxide is adsorbed from a nonpolar gas stream containing up to about 1% by volume carbon dioxide by subjecting the gas stream to a pressure swing adsorption process having an adsorption step and an adsorbent regeneration step, wherein the adsorption step comprises passing the gas stream through a two layer adsorption zone which contains a first layer of activated alumina and a second layer of a zeolite having a silicon/aluminum atomic ratio of about 1.5 or higher, thereby adsorbing substantially all carbon dioxide from the gas stream. In preferred embodiments the minimum silicon/aluminum atomic ratio of the zeolite adsorbent is about 2.0. In preferred embodiments the maximum silicon/aluminum atomic ratio of the zeolite is about 500, and in more preferred embodiments it is about 150.

In a preferred embodiment, the zeolite is selected from those having the faujasite, mordenite, chabazite, offretite, erionite, ferrierite, gmelinite, EMT, beta, omega, type A, type L, ZSM-5, ZSM-11, ZSM-12, ZSM-18, ZSM-57, NU-87 structures and combinations of these. In this embodiment, the zeolite preferably has a silicon/aluminum atomic ratio in the range of about 2 to about 150.

In another preferred embodiment, the zeolite used in the invention is type Y zeolite, ferrierite, type EMT zeolite, beta, ZSM-5, ZSM-11, ZSM-12, ZSM-57, NU-87 or combinations of any of these. In this case, the silicon/aluminum atomic ratio of the zeolite is preferably in the range of about 1.5 to about 500. In another preferred embodiment, the zeolite is sodium Y zeolite, dealuminated type Y zeolite, ZSM-5 or combinations of any of these. In this case, the silicon/aluminum atomic ratio of the zeolite is preferably in the range of about 2 to about 150. In another preferred embodiment, the zeolite is ZSM-5, ZSM-11, ZSM-12, ferrierite, beta, NU-87 or combinations of any of these. In this case, the silicon/aluminum atomic ratio of the zeolite is preferably in the range of about 10 to about 150. In the most preferred embodiment, the zeolite is type Y zeolite.

The invention is particularly suitable for removing carbon dioxide from gas streams containing up to about 1000 ppm carbon dioxide.

In cases where the gas stream additionally contains water vapor, the water vapor is adsorbed from the gas stream as it passes through the layer of activated alumina, thereby producing a substantially water vapor-free and carbon dioxide-free gas stream.

The invention is particularly suitable for the removal of carbon dioxide and water vapor from air.

In another preferred embodiment, the zeolite has as exchangeable cations one or more of hydrogen ions, lithium ions, sodium ions and potassium ions. In a more preferred aspect of this embodiment, the adsorbent is predominantly sodium-exchanged zeolite. A most preferred sodium zeolite is sodium Y zeolite, a sodium-exchanged zeolite having a faujasite structure with a silicon/alumina atomic ratio of 1.5 or greater. In this embodiment, the silica/aluminum atomic ratio is preferably at least 2.

In another preferred embodiment, the zeolite is selected from those having ZSM-5,ZSM-11, ZSM-12, ferrierite, beta, mordenite, NU-87 or combinations of these, particularly selected from those having a silicon/aluminum atomic ratio of at least about 5 and up to about 500, and especially at least about 10 and up to about 150.

In another preferred embodiment, the zeolite is selected from those having faujasite, type A, type L, offretite, erionite, EMT, and chabazite structures and combinations of these, particularly selected from those having a silicon/aluminum atomic ratio of at least about 2 up to about 100, and especially up to about 50, and having as exchangeable cations one or more of hydrogen ions, lithium ions, sodium ions and potassium ions.

In one preferred embodiment the adsorption step of the pressure swing adsorption process is carried out at a temperature in the range of about 0 to about 50° C. It is likewise preferably carried out at a pressure in the range of about 0.9 to about 50 bara. The adsorbent regeneration step of the pressure swing adsorption process is carried out at a pressure less than that used in the adsorption step, and preferably in the range of about 0.1 to about 2 bara. The adsorbent regeneration step is preferably carried out at a temperature in the range of about 0 to about 100° C.

In another preferred embodiment of the invention, the adsorbent is purged with a substantially water vapor- and carbon dioxide-free gas stream during at least part of the adsorbent regeneration step.

The invention is particularly suitable for the purification of air that is subsequently subjected to cryogenic distillation. In this case, the adsorbent is preferably purged during at least part of the adsorbent regeneration step with a portion of the purified air produced in the adsorption process or a waste stream produced during the cryogenic distillation of the air.

DETAILED DESCRIPTION OF THE INVENTION

The invention is useful for removing low levels of carbon dioxide from nonpolar gases. If water vapor and hydrocarbon impurities are present in the nonpolar gas being treated, these impurities will also be removed from the gas as it passes through the activated alumina layer. The process of the invention is particularly effective for removing carbon dioxide, water vapor and hydrocarbons from air to produce high purity air. The term "high purity air" is used herein to describe air that is substantially carbon dioxide-free, substantially water vapor-free and substantially hydrocarbon-free, i.e. air that contains less than 1 ppm (part per million) each of water vapor and carbon dioxide. It is highly desirable that air feed to cryogenic air distillation plants be high purity air, and most preferred that the air feed contain no more than about 3 ppb (parts per billion) of carbon dioxide.

In accordance with a preferred embodiment of the invention, carbon dioxide that is present in gas streams at low partial pressures, for example up to about 1% by volume, is removed from the gas streams by PSA using a two layer adsorption system, wherein the first layer, i.e. the upstream layer is activated alumina and the second layer, i.e. the downstream layer is one of the adsorbents listed above or a combination of these adsorbents. As used in this invention, the term "zeolite" means porous crystalline aluminosilicate. The term "combination" as used with reference to the selected zeolites means includes mixtures and/or intergrowths of two or more of the adsorbents. "Mixtures" includes mixtures of two or more of the various types of zeolites and variations of the same type of zeolite, for instance a mixture of sodium-exchanged faujasite and lithium-exchanged faujasite.

The zeolite adsorbents used in the invention have a high capacity for carbon dioxide, and a low capacity for nonpolar gases, such as nitrogen, oxygen, argon, helium and hydrogen. These adsorbents are particularly effective for removing carbon dioxide from nonpolar gas streams when the carbon dioxide is present at up to about 1000 ppm, and even effective when it is present at up to about 1% by volume. Since atmospheric air generally contains up to about 350–400 ppm carbon dioxide, the adsorbents of the invention will efficiently remove carbon dioxide from atmospheric air down to the ppb level.

In the preferred embodiment, the zeolite adsorbents generally have hydrogen ions and/or alkali metal ions, including mixtures of alkali metal ions as the sole cations or as predominant exchangeable cations, i.e. ions which compensate the negative charge of the aluminosilicate lattice. "Predominant", in this sense, means that at least 90% of the exchangeable cations are alkali metal or hydrogen cations. The exchangeable cations may be of a single cation species or a mixture of species. The preferred cations are the sodium and potassium ions, and the most preferred cation is the sodium ion. The zeolite often contains up to about 10% residual ions, i.e. ions associated with the zeolite as exchangeable cations other than alkali metal ions. The residual exchangeable ions may be present as a result of the procedure used to manufacture the cation exchanged zeolites of the invention, or they may be intentionally introduced into the zeolites to further modify their properties. Generally, the residual exchangeable ions will be ammonium, calcium, magnesium, strontium, barium or zinc ions or mixtures of these. The preparation of the adsorbents used in the invention is described in the literature, and thus is not a part of the invention.

The zeolites used in the invention can have a variety of physical forms, and the exact physical form of the product may affect its efficiency in PSA processes. When the zeolites of the present invention are to be used in industrial adsorbers, it may be preferred to aggregate (e.g. pelletize)

the zeolite, as pulverulent zeolite may compact in industrial size adsorption columns, thereby blocking, or at least significantly reducing flow through the columns. Those skilled in molecular sieve technology are aware of conventional techniques for aggregating molecular sieves. Such techniques usually involve mixing the molecular sieve with a binder, which is typically a clay, thereby forming aggregates from the mixture, as by extrusion or bead formation, and then heating the formed aggregate to a temperature in the range of about 550 to about 700° C. to convert the green aggregate into a form which is resistant to crushing. The binders used to aggregate the zeolites may include clays, silicas, aluminas, metal oxides and mixtures thereof. In addition, the zeolites may be aggregated using materials such as silica-alumina, silica-magnesia, silica-zirconia, silica-thoria, silica-beryllia, and silica-titania, as well as ternary compositions, such as silica-aluminathoria, silica-alumina-zirconia and clays present as binders. The relative proportions of the zeolite and binder material may vary widely. Where the zeolite is to be formed into aggregates prior to use, such aggregates are desirably about 0.5 to about 5 mm in diameter.

The temperature at which the adsorption step of the adsorption process is carried out depends upon a number of factors, such as the particular gases being separated, the particular adsorbent being used, and the pressure at which the adsorption is carried out. In general, the minimum adsorption temperature will not be below about 0° C., and the maximum adsorption temperature will not exceed about 100° C. It is usually preferred that the adsorption temperature not exceed about 50° C. The minimum pressure at which the adsorption step is carried out is generally about 0.9 bara, and the maximum adsorption pressure is generally about 50 bara.

During the adsorbent regeneration step, the pressure is generally reduced to about 1 bara or lower, for example it can be reduced to as low as about 0.1 bara, but is usually not reduced to lower than about 0.2 bara, since the small improvement obtained by further reducing the pressure will not usually justify the increased energy cost required to reach the lower pressure levels. During adsorbent regeneration, the temperature typically is as low as 0° C. and is generally not higher than about 100° C.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

Atmospheric air was purified in a laboratory-scale pressure swing adsorption system consisting of a vertical cylindrical stainless steel vessel 91 inches long and having an internal diameter of 2.15 inches. The vessel was packed 52 inches of 7×12 mesh beads of activated alumina (sold by LaRoche Industries, Inc. under the trade designation A-201) and 39 inches of 1/16 inch silicalite (sold by UOP under the trademark Molsiv Adsorbent). The PSA cycle included as steps: pressurization to 5 bara, 300 secs.; adsorption at 5 bara, 1440 secs.; depressurization to 1 bara, 60 secs.; and purge regeneration at 1.3 bara, 1080 secs. The gas flow rates during the adsorption and purge regeneration steps were 110 l/min., and 85 l/min., respectively. The pressurization step was carried out by charging carbon dioxide-free and water vapor-free nitrogen into the adsorption vessel. During the adsorption step compressed air saturated with water vapor and containing 350–400 ppm carbon dioxide was passed upwardly through the adsorption vessel at about 25° C. Purge regeneration was carried out by passing water vapor-free and carbon dioxide-free nitrogen through the adsorption vessel at about 25° C. During the process the carbon dioxide and water vapor content at various levels of the adsorption vessel were measured using a carbon dioxide analyzer (Horiba, model GA-360) and a moisture analyzer (Panametrics, Series 3), respectively.

The above-described PSA cycle was repeated continuously more than 1000 times. It was found that both $CO_2$ and water vapor concentration in the purified air streams from bed heights of 51.5 inches and above were below the carbon dioxide and water vapor detection limits.

The adsorbent specific product (calculated using the equation: feed flow rate×feed time/adsorbent weight needed to produce air containing not more than about 3 ppb carbon dioxide) was about 11.6 scf/lb of activated alumina+silicalite. The specific product required to reach 3 ppb carbon dioxide in air purification using activated alumina alone as the adsorbent was about 3.8 scf/lb of alumina.

EXAMPLE 2

Example 1 was repeated except that the silicalite used in Example 1 was replaced by 39 inches of dealuminated type Y zeolite (sold as 1/16 inch pellets by Degussa AG under the trademark Wessalith® DAY). The PSA experimental conditions are similar to those described in Example 1 except the cycle times are: pressurization, 150 secs.; adsorption, 720 secs.; depressurization, 30 secs.; and purge regeneration, 540 secs.

The PSA cycles were repeated for more than 500 times. It was found that both carbon dioxide and water vapor concentration in the purified air streams from bed heights of 63.5 inches and above were below the carbon dioxide and water vapor detection limits. The adsorbent specific product (calculated using the equation: feed flow rate×feed time/adsorbent weight needed to produce air containing not more than about 3 ppb carbon dioxide) was about 7.6 scf/lb of activated alumina+dealuminated type Y zeolite.

The higher specific product obtained using the two-layer activated alumina-silicalite combination or activated alumina-dealuminated type Y zeolite combination indicates that using the two layer combinations will reduce the adsorption vessel size necessary to produce high purity air.

Although the invention has been described with particular reference to specific examples, these features are merely exemplary of the invention and variations are contemplated. For instance, the adsorption cycle can include equalization and product backfill steps, and combinations of the specified zeolite adsorbents can be used in a single layer or multiple layers. Also layers of additional adsorbents and chemical reactants can be used in combination with the activated alumina and zeolite layers when it is desired to remove other impurities from the gas. The scope of the invention is limited only by the breadth of the appended claims.

What is claimed is:

1. A method of removing carbon dioxide from air containing up to 1000 ppm carbon dioxide by a pressure swing adsorption process having an adsorption step and an adsorbent regeneration step, the adsorption step of which comprises passing said gas through a two layer adsorption zone containing a first layer of activated alumina and a second layer comprising dealuminated type Y zeolite having a high capacity for carbon dioxide and a low capacity for nitrogen and oxygen and having a silicon/aluminum atomic ratio of at least about 1.5, thereby producing a substantially carbon dioxide-free gas stream.

2. The method of claim 1, wherein said silicon/aluminum atomic ratio is in the range of about 2.0 to about 150.

3. The method of claim 1, wherein said gas additionally contains water vapor and said water vapor is removed from said gas as it passes through said layer of activated alumina, thereby producing a substantially water vapor- and carbon dioxide-free gas.

4. The method of claim 3, wherein the air leaving said adsorption zone is subjected to a cryogenic distillation step.

5. The method of claim 4, wherein the adsorbents in said adsorption zone are purged with a waste stream produced during said cryogenic distillation step during at least part of said adsorbent regeneration step.

6. The method of claim 1 or claim 3, wherein said adsorption step is carried out at a temperature in the range of about 0 to about 50° C.

7. The method of claim 6, wherein said adsorption step is carried out at a pressure in the range of about 0.9 to about 50 bara.

8. The method of claim 6, wherein said adsorbent regeneration step is carried out a pressure in the range of about 0.1 to about 2 bara.

9. The method of claim 1 or claim 3, wherein said adsorbent regeneration step is carried out at a temperature in the range of about 0 to about 100° C.

10. The method of claim 1 or claim 3, wherein the adsorbents in said adsorption zone are purged with a substantially water vapor- and carbon dioxide-free gas stream during at least part of said adsorbent regeneration step.

* * * * *